United States Patent [19]

Calderon

[11] 4,035,179
[45] July 12, 1977

[54] METHOD AND APPARATUS FOR CONTROLLING POLLUTION IN STEEL FURNACES

[75] Inventor: Samuel Calderon, Akron, Ohio

[73] Assignee: Calderon Automation, Inc., Cleveland, Ohio

[21] Appl. No.: 564,870

[22] Filed: Apr. 4, 1975

[51] Int. Cl.² .......................................... C21C 5/50
[52] U.S. Cl. ...................................... 75/60; 75/61
[58] Field of Search .............. 75/59, 60, 61; 266/31

[56] References Cited

U.S. PATENT DOCUMENTS

| | | | |
|---|---|---|---|
| 3,592,630 | 7/1971 | Willett | 75/60 |
| 3,599,949 | 8/1971 | Grenfell | 75/60 |
| 3,617,897 | 11/1971 | Sandberg | 75/60 |
| 3,681,052 | 8/1972 | Iwao | 75/60 |
| 3,844,769 | 10/1974 | Calderon | 75/60 |

Primary Examiner—P. D. Rosenberg

[57] ABSTRACT

An improved method and apparatus for making possible the collection of fumes during the charging of a furnace, particularly a steelmaking furnace using a conventional oxygen blowing process and which furnace rotates about a trunnion arrangement. The furnace is of the type having an upright position with its mouth aligned with a hood for evacuating fumes generated during blowing. A method and apparatus are provided for charging molten iron, solid iron or steel scrap while the furnace mouth is located under the hood.

4 Claims, 6 Drawing Figures

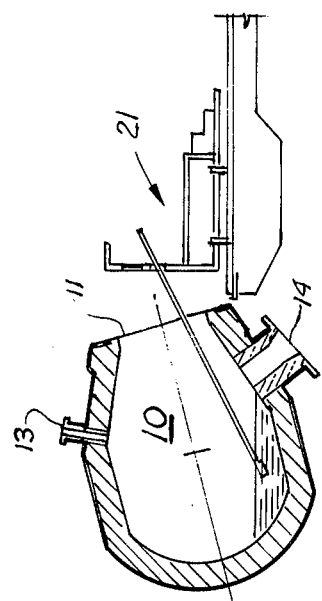
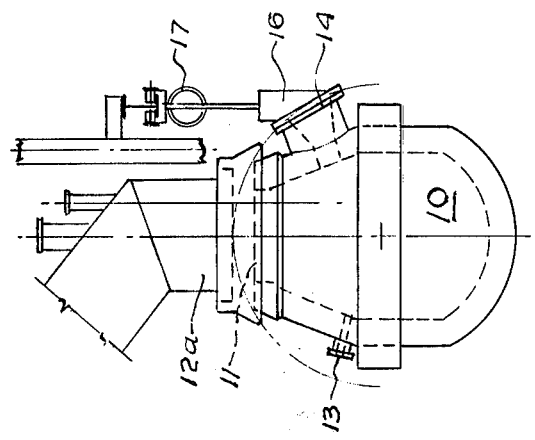
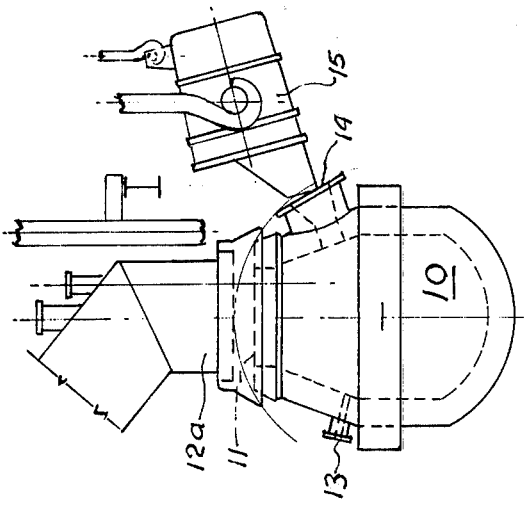
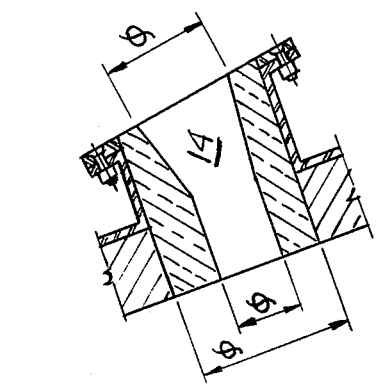
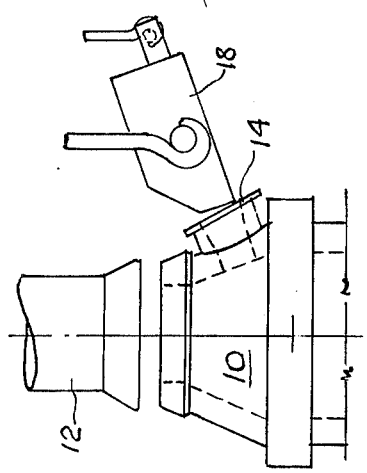
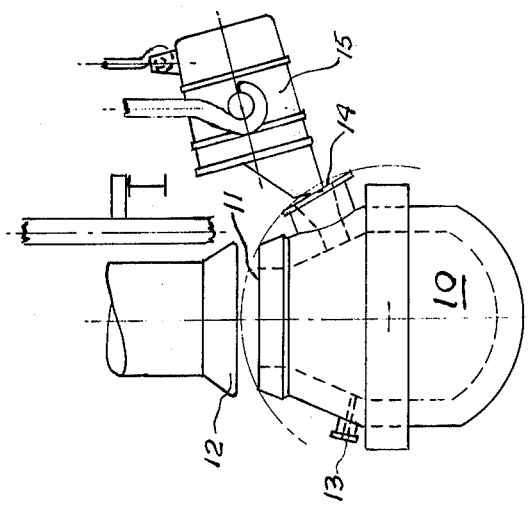

METHOD AND APPARATUS FOR CONTROLLING POLLUTION IN STEEL FURNACES

BACKGROUND OF THE INVENTION

The present invention relates to an improved method of and apparatus for collecting the fumes from a steelmaking furnace which is rotatable about an axis and known in the art as "Oxygen Steelmaking Furnace."

More particularly, this invention relates to an improved method and apparatus of fume collection during charging of molten metal and scrap used in modern steelmaking.

In the art of steelmaking in an oxygen steelmaking furnace oxygen is blown onto a charge of molten metal or scrap while the furnace is in an upright postion with its mouth opening generally upwardly. During the blowing of oxygen the furnace, in its upright position, is conventionally provided with a gas evacuation system including a hood which is aligned with the furnace mouth. In such a furnace, the operation is generally as follows:

i. Scrap is charged after the furnace is rotated in a first direction from the upright position into an inclined position;

ii. Molten iron is charged while the furnace is rotated into the inclined position;

iii. Oxygen is blown onto the charge after the furnace has been returned to an erect, or upright position;

iv. At the beginning of the blow fluxes are added;

v. At the end of the blow temperature and sample are taken generally after the furnace is again rotated in the first direction into the inclined position;

vi. If the bath meets specifications the heat is tapped into a ladle by rotating the furnace in the opposite direction from the first direction;

vii. The slag is discharged by rotating the furnace 180° from the blowing position and the cycle is completed;

viii. The furnace is rotated to the inclined position and the process is repeated.

During the charging of molten iron in the inclined furnace a very serious pollution problem occurs since the mouth of the furnace is not positioned under the hood which is used to take emissions during blowing. During the charging of molten iron such emissions are so violent, especially if the scrap is dirty or oily, that great quantities of fumes including a flaming tongue laden with smoke are released from the mouth of the furnace into the building. These polluting conditions cannot be withdrawn into the conventional hood whether it is of the open or closed type because the furnace is in its inclined position and the mouth thereof is not in registry with the point of entry of the hood. The hood is efficient in withdrawing emissions when the furnace is in its upright position but not in its inclined position to take the charge.

SUMMARY OF THE PRESENT INVENTION

The present invention solves the pollution problem taking place during the charging of molten metal, or of solid iron or steel scrap, in a basic oxygen furnace by providing a method and apparatus for charging the furnace while the furnace is in its upright position. Accordingly, the main object of the present invention is to provide an effective pollution control system to a rotatable furnace so that the charging of the molten metal is performed by having the furnace in an upright position to receive its molten metal charge in order to make possible the efficient collection of the generated fumes into the hood.

Another object of this invention is to provide a special aperture separate from the mouth of the furnace preferably on the side of the cone of the furnace adapted to serve as an entry point for molten metal while the furnace mouth is substantially in registry with the hood normally used to collect fumes during blowing.

Yet another object of this invention is to provide said aperture at such height in the cone so as to permit the taking of samples and temperatures without spilling metal through said aperture.

Further yet another object of this invention is to provide a steelmaking furnace in which the blowing cycle may be started during the charging of the molten metal to initiate the refining in order to minimize the time taken to charge molten iron and therefore increase productivity.

It is another object of the present invention to provide refractory lining to said aperture to withstand the temperatures to which said aperture is subjected.

It is still another object of the present invention to provide a cover over said aperture in order to prevent spillage during the violent reactions taking place within said furnace as oxygen is blown into said furnace.

It is yet another object of the instant invention to provide said aperture to face the charging aisle of a steel-making facility in order to make possible the convenient access thereof by a ladle crane.

It is further yet another object to charge scrap into a steelmaking furnace while the furnace is in its upright position to control emission during charges of scrap, especially where oily scrap is charged.

Other objects of this invention will appear in the following description and appended claims. Reference is made to the accompanying drawings forming a part of this specification and wherein reference characters designate corresponding parts in the several views.

BRIEF DESCRIPTION OF THE DRAWINGS

FIG. 1 shows a partial view of an oxygen steelmaking system being charged in its upright position according to the present invention. The furnace is shown in the upright position in process of receiving molten iron;

FIG. 2 is also a partial view of a steelmaking furnace during the charging of molten iron into the furnace and disclosing an alternative closed type hood used for blowing and being equipped with a movable skirt;

FIG. 3 is similar to FIG. 2 showing the furnace being in the blowing position with the molten iron charging aperture covered;

FIG. 4 is a sectional view of the furnace showing the taking of a steel sample while the furnace is inclined;

FIG. 5 is a cross-sectional view of a charging aperture according to the present invention; and FIG. 6 is a partial view showing scrap charging while the furnace is in its upright position.

DESCRIPTION OF PREFERRED EMBODIMENTS

Before exploring the present invention in detail, it is to be understood that the instant invention is not limited in its application to the details of construction and the arrangement of parts illustrated in the accompanying drawings since the invention is capable of other embodiments and of being practiced or carried out in various ways. Also, it is to be understood that the phraseology or terminology employed herein is for the purpose of description and not limitation since the invention is applicable to other metal making processes besides steel.

In FIG. 1, 10 indicates an oxygen furnace which is shown in an upright position with its mouth 11 facing generally upwardly. The furnace 10 is rotatable in clockwise and counterclockwise directions 19 about an axis 20. Drive mechanisms for rotating the furnace are conventional and have therefore not been illustrated. Furnace 10 is refractory lined and includes a mouth 11 through which fumes and gases leave furnace 10 during blowing of oxygen onto the scrap and molten metal.

It is imperative to collect emissions during the blowing of oxygen into furnace 10 while it is in upright position and for this purpose hood 12, connected to a conventional dust collection plant (not shown), is furnished. As an alternative to hood 12 of FIG. 1, hood 12a (FIG. 2), which is similar to hood 12 except that it is of the closed type, serves the same purpose. Either hood arrangement creates a stack effect at the mouth of the furnace.

Furnace 10 is provided with tap hole 13 and charging hole 14 and preferably tap hole 13 faces the teaming aisle of the steel plant and charging hole 14 faces the charging aisle of the steel plant.

Charging hole 14 is preferably located in the conical shaped wall of the furnace 10 and is made of such size and shape that ladle 15 can comfortably discharge molten metal into furnace 10 while the furnace is in its upright position and mouth 11 is under hood 12. If desired, solid or scrap metal from box 18 (FIG. 6) may also be discharged into the furnace through charging hole 14. A cover 16 (FIG. 3) may be provided over the opening of charging opening 14 as a precaution against slopping which is common during blowing. Hoist 17 serves to manipulate cover 16. cl OPERATION In operation, furnace 10 is initially charged with scrap either through aperture 14 while the furnace is in its upright position or through mouth 11 with the furnace rotated clockwise to align mouth 11 with box 18. Furnace 10 is then positioned in its upright position and ladle 15 is directed by an overhead crane (not shown) so that the spout of ladle 15 enters partially in charging hole 14 to discharge the contents of molten iron contained in ladle 15. While the molten metal is poured into furnace 10 through charging hole 14, the gases generated because of the charging are pulled into hood 12 which has a negative draft. Once the contents of ladle 15 are transferred into furnace 10 cover 16 is placed over charging hole 14 by hoist 17.

The blowing cycle may begin during or after the charge of molten iron. At the completion of the blowing portion of the cycle, cover 16 is removed, furnace 10 is inclined and temperature and samples taken from a platform 21 which may be somewhat elevated as shown by FIG. 4. If the temperature and analysis are acceptable furnace 10 is rotated approximately 180° from the position shown by FIG. 4 to tap the steel into a ladle (not shown) through tap hole 13.

By providing an entry point for molten iron to make possible the charging of molten iron while the basic oxygen furnace is in its upright position with the mouth thereof under the entry point of a hood under suction it is submitted that the present invention provides a new and novel method and apparatus for controlling emissions from rotatable industrial furnaces and in particular from oxygen blown steelmaking furnaces during the charging of molten iron. While preferred embodiments of the present invention have been illustrated and described in detail the invention is not to be considered limited to the precise construction shown. It is intended to cover hereby all adaptations, modifications and uses of the invention which come within the scope of the appended claims.

I claim:

1. A method of charging a steelmaking furnace with molten metal, comprising the steps of supporting a steelmaking furnace for rotational motion about a substantially horizontal axis, supporting said furnace in an upright position with the mouth of said furnace opening generally upwardly, providing a hood for collecting fumes from said steelmaking furnace and aligning said hood with the mouth of said steelmaking furnace when said furnace is in said upright position to provide a stack effect, charging said steelmaking furnace with metal while said steelmaking furnace is in said upright position, and blowing oxygen onto the charge of metal while said steelmaking furnace is in said upright position.

2. In a steelmaking furnace of the type wherein said furnace is mounted for pivotal movement about a generally horizontal axis, the furnace being supported in an upright position with its mouth opening generally upwardly and being aligned with a hood for collecting gases generated during the steelmaking process, means for blowing oxygen into the furnace while furnace is in an upright position, said furnace further including a tapping aperture, the improvement comprising means for charging said steelmaking furnace with metal material while said furnace is in said upright position.

3. In a steelmaking furnace as set forth is claim 2, said means for charging said furnace comprises means forming a charging aperture in said furnace.

4. In a steelmaking furnace as set forth in claim 3 wherein said steelmaking furnace is of the type having a conically-shapped wall portion tapering outwardly from said mouth, the improvement comprising said charging aperture being formed in said conically-shaped wall portion.

* * * * *